June 14, 1966  M. A. SAAD  3,255,969
APPARATUS FOR CLEANING TANKS
Filed May 1 1964  4 Sheets-Sheet 1
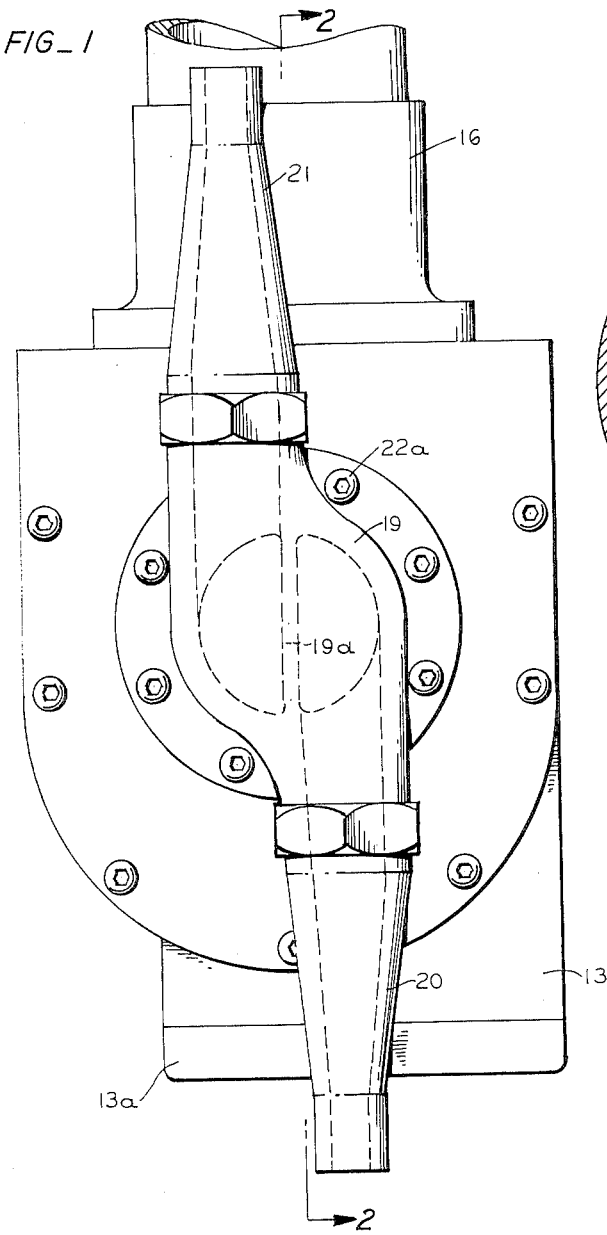
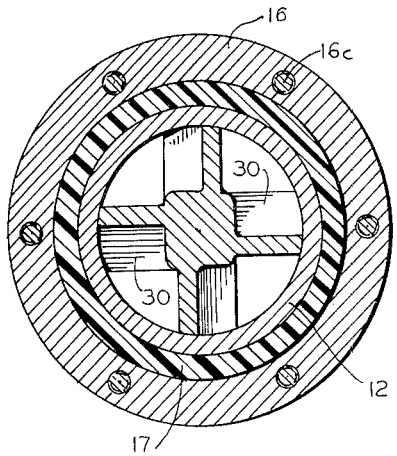
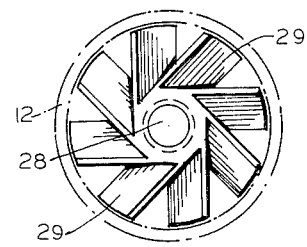
INVENTOR.
MICHEL A. SAAD
BY
Allen and Chromy
ATTORNEYS

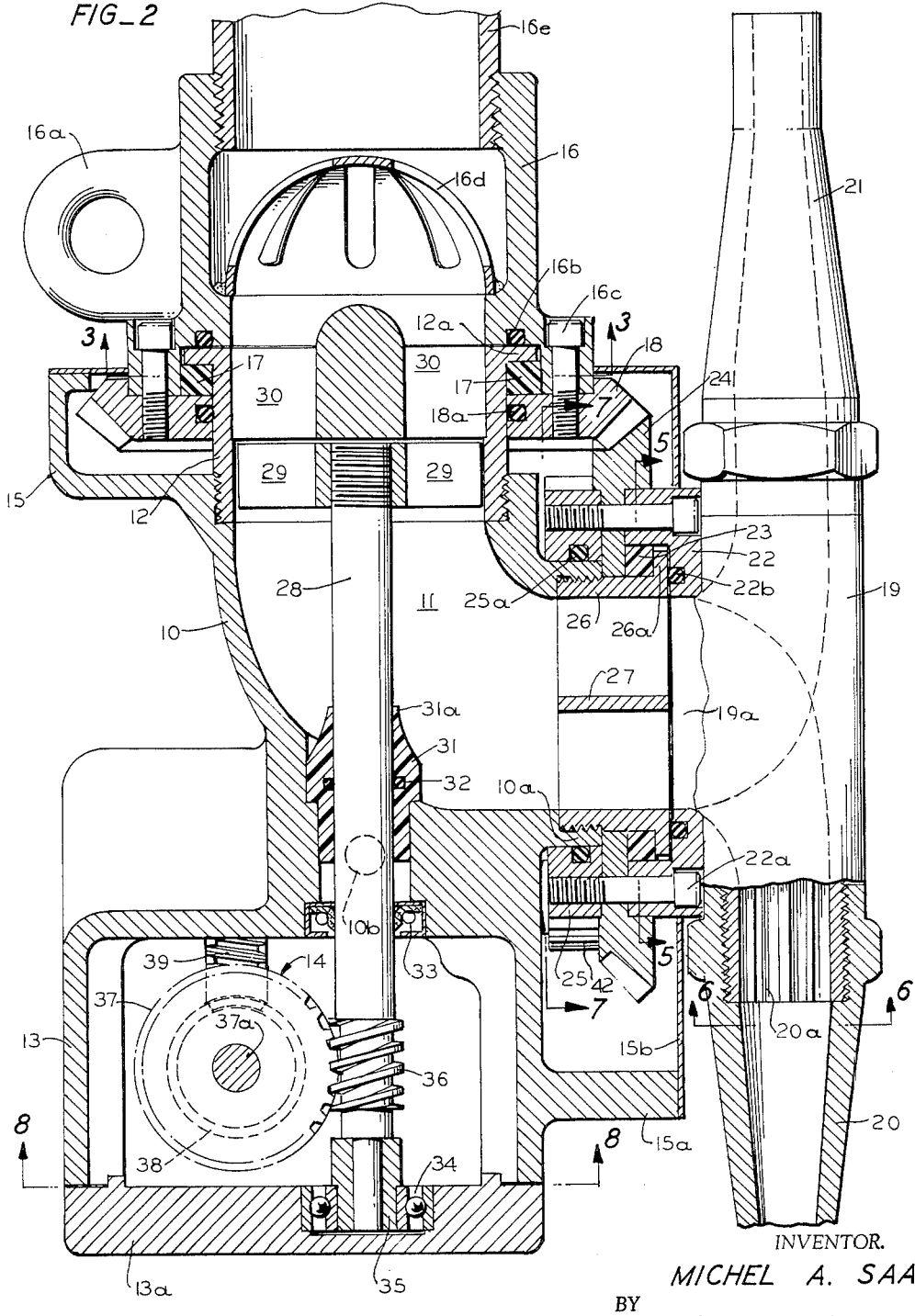

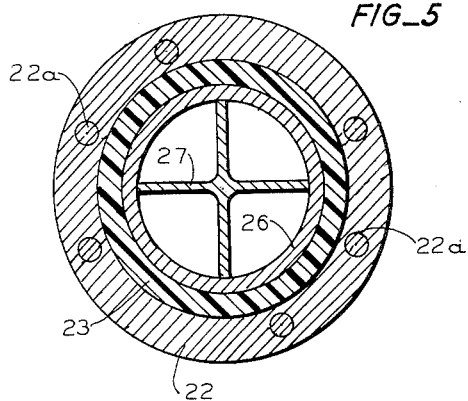
FIG_5
FIG_6
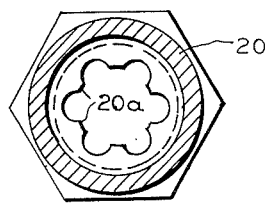
FIG_7
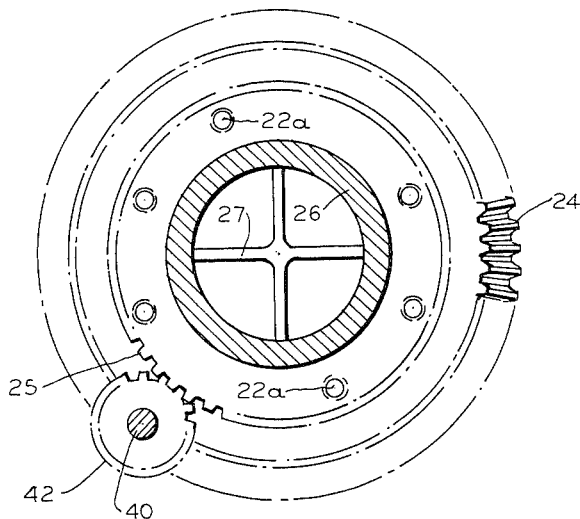
INVENTOR.
MICHEL A. SAAD
BY
ATTORNEYS June 14, 1966  M. A. SAAD  3,255,969
APPARATUS FOR CLEANING TANKS
Filed May 1, 1964  4 Sheets-Sheet 4
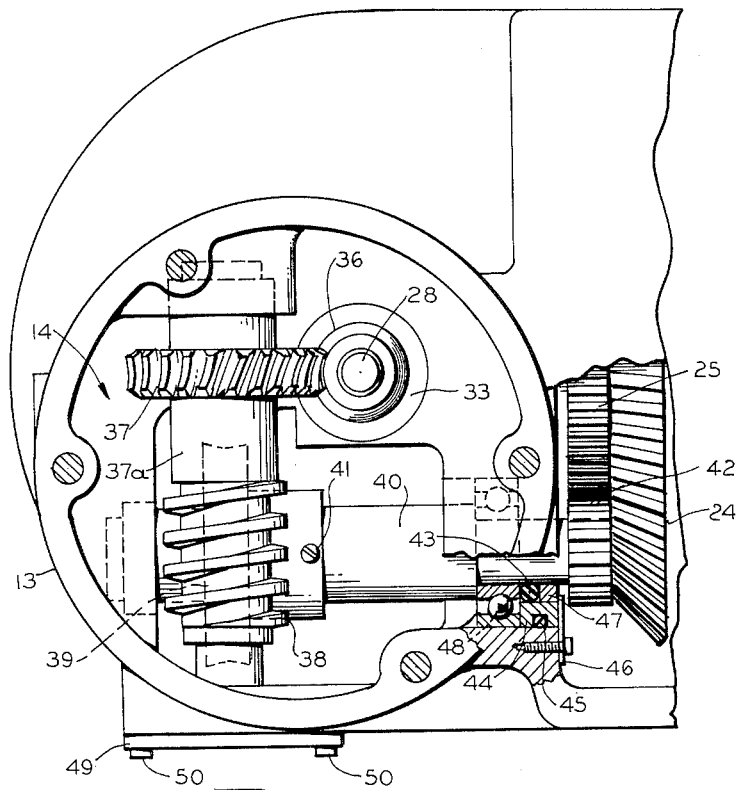
FIG_8
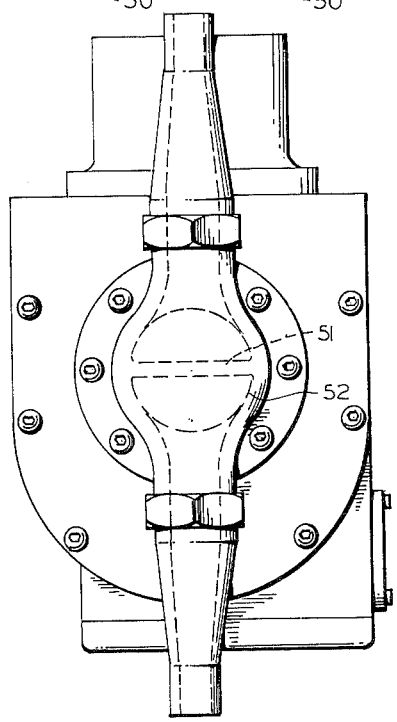
FIG_9
INVENTOR.
MICHEL A. SAAD
BY
Allen and Chromy
ATTORNEYS United States Patent Office 3,255,969
Patented June 14, 1966

3,255,969
APPARATUS FOR CLEANING TANKS
Michel A. Saad, 2676 Newhall St., Apt. 31,
Santa Clara, Calif.
Filed May 1, 1964, Ser. No. 364,153
16 Claims. (Cl. 239—227)

This invention relates to a water jet cleaning device for washing out shipping and storage tanks.

An object of this invention is to provide an improved device which is water rotated and which is constructed to direct two or more jets of cleaning solution over the inside surfaces of shipping or storage tanks to wash and clean the insides thereof.

Another object of this invention is to provide an improved hydraulic tank cleaning device having improved bearings and seals whereby improved operation is obtained and the life of the device is increased.

Another object of this invention is to provide an improved hydraulic tank cleaning device utilizing a bearing assembly which is a combination of a thrust bearing and face seal in which the face sealing material and bearing material is made of a plastic consisting of tetrafluoroethylene polymer, and the sealing action is accomplished by hydraulic pressure.

Still another object of this invention is to provide an improved hydraulic tank cleaning device which is provided with a coupling member having internal threads for connecting it to the fluid supply, said coupling member being connected to a thrust bearing and bevel gear arrangement which is stationary and about which this device rotates during the operation thereof, said device also being provided with a similar thrust bearing and bevel gear combination on the nozzle side of the device, both of the thrust bearings being provided with O-ring seals whose main function is to prevent dirt and other foreign material from entering the thrust bearings.

Still another object of this invention is to provide an improved hydraulic tank cleaning device with the bearings and seals thereof made of plastic which is self-lubricating, said plastic seals being in the form of face-seals which rely on hydraulic pressure to provide sealing action, thereby eliminating the necessity of using springs and the like for this purpose.

Still another object of this invention is to provide an improved hydraulic tank cleaning device utilizing a turbine and reduction gearing in which the drive shaft of the turbine is provided with a seal and bearing made of a plastic consisting of tetrafluoroethylene polymer to prevent the cleaning solution from entering the reduction gear box, said plastic bearing being constructed such that it is provided with flexible forward surfaces that are pressed into engagement with the drive shaft by the hydraulic pressure. The bearing is also provided with an O-ring seal inside thereof engaging the drive shaft.

Another object of this invention is to provide an improved hydraulic tank cleaning device provided with a casting which is made in one piece so as to reduce the weight thereof, said casting also being provided with a passageway therethrough of comparably large diameter may be lined with corrosion resisting material, said passageways having few obstructions and no sharp bends.

Still another object of this invention is to provide an improved hydraulic tank cleaning device that is provided with a reduction gearing in the drive arrangement thereof, said reduction gearing being housed in a sealed gear box provided with oil lubrication and inside bearings except on the input and output shafts thereof.

Still another object of this invention is to provide an improved hydraulic tank cleaning device in which the cleaning solution, shortly after leaving the turbine drive of the device, is guided by flow-straightening devices so that the lengths of the nozzles of the device may be made as short as possible so that the device may be used in tanks with small openings.

Still another object of this invention is to provide an improved hydraulic tank cleaning device that is provided with a one-piece casting used for the housing thereof, said casting also being provided with guards extending partially around the bevel gears used in the final drive of this device whereby these gears are protected from accidental damage.

Still another object of this invention is to provide an improved hydraulic tank cleaning device in which the turbine drive thereof is provided with a shaft that is supported only by two bearings so as to allow better aligning of the shaft.

Still another object of this invention is to provide an improved hydraulic tank cleaning device in which one of the gears in the gear box is provided with a shear pin which is used as a safety feature if the device is accidentally dropped resulting in a high torque on the nozzles.

A further object of this invention is to provide an improved hydraulic tank cleaning device in which the water after leaving the turbine drive of the device is guided by a series of flow straightening devices which straighten the flow of the cleaning solution, said series of devices starting with webs upstream of the nozzle housing of this device which may extend into the nozzle support.

Other and further objects of this invention will be apparent to those skilled in the art to which it relates from the following specification, claims and drawings in which, briefly:

FIG. 1 is an elevation view showing the nozzles of this device;

FIG. 2 is a vertical section taken along the line 2—2 of FIG. 1;

FIG. 3 is a sectional view taken along the line 3—3 of FIG. 2;

FIG. 4 is a detail view of the turbine;

FIG. 5 is a sectional view taken along the line 5—5 of FIG. 2;

FIG. 6 is a sectional view taken along the line 6—6 of FIG. 1 showing the water flow straighteners;

FIG. 7 is a sectional view taken on line 7—7 of FIG. 2;

FIG. 8 is a view taken along the line 8—8 of FIG. 2 showing the speed reduction gear train;

FIG. 9 is a view showing a modified nozzle arrangement.

Referring to the drawing in detail, reference numeral 10 designates the housing of this device which may be made in one piece by casting suitable metals or alloys such as various types of bronze, stainless steel or the like. This housing is provided with an elbow-shaped cavity 11 therein, one end of this cavity is threaded to receive the tubular bushing 12 which is threaded thereinto. The housing 10 is provided with a gear box 13 in which the reduction gearing 14, which will be described hereinafter, is positioned. The gear box 13 is provided with a cover 13a. The housing 10 is also provided with projecting guards 15 and 15a in which the bevel gears 18 and 24, respectively, are positioned so that they are partially enclosed thereby.

This device is provided with a threaded member 16 for connecting it to a conventional supply pipe 16e which supports the device in the tank being cleaned and through which the cleaning solution is provided to the device. The member 16 is provided with one or more loops 16a of circular cross section which may be attached to a suitable chain or rope for positioning the device inside the tank to be cleaned. The member 16 is provided with a strainer 16d which prevents foreign matter from entering the housing. The member 16 is also provided with a flange through which a plurality of holes are formed for receiving the bolts or machine screws 16c which are used for attaching the member 16 to the bevel gear 18. Thus the coupling member 16 is rigidly attached to the bevel gear 18 with respect to which bushing 12 is rotatable. Bushing 12 is threaded into the housing 10 so that the passage through this sleeve is aligned with the cavity 11 in the housing. The seating of bushing 12 in the housing is machined to ensure aligning of the passageway therethrough without any clearance in the seat. The bevel gear 18 is partially enclosed by the flange member 15 provided to the housing.

The bushing 12 is provided with a flange 12a extending radially therefrom at the outer end thereof, and an annular cavity is provided between this flange and the bevel gear 18 for receiving the ring-shaped seal and bearing 17. The bearing 17 is made of a plastic consisting of tetrafluoroethylene polymer designated in commerce as "Teflon" or the like. The ring member 17 functions as a seal between the coupling member 16 and the bushing 12. In addition, O-rings 16b and 18a made of neoprene or the like may be provided as seals between member 16 and bushing 12 to prevent dirt and foreign matter from entering the bearing. O-ring 16b is positioned in a circular groove formed in the coupling member 16, and this O-ring engages the end surfaces of the flange 12a. O-ring 18a is positioned in a circular groove formed in the inside of the bevel gear 18 and engages the outer surfaces of the bushing 12.

This device is provided with a nozzle supporting member 19 to which the nozzles 20 and 21 are attached by suitable threads. Member 19 is provided with an annular flange 22 through which a plurality of holes is drilled for receiving the bolts or machine screws 22a which are used for attaching this annular flange 22 to the bevel gear 24 and to the ring gear 25. The annular flange 22, bevel gear 24 and ring gear 25 are all rotatable with respect to the housing 10 around the neck 10a which fits into the ring gear 25. The inside of this neck 10a is threaded to receive the threads of the bushing 26 whereby this sleeve is attached to the housing. The seating of bushing 26 in the housing is machined to ensure aligning of the passageway therethrough without any clearance in the seat. The inside of the bushing 26 is provided with webs 27, the purpose of which will be described hereinafter. The bushing 26 is also provided with a radially extending flange 26a at the outer end thereof, and the ring-shaped seal and bearing 23 is positioned between this flange 26a and the bevel gear 24. The ring-shaped member 23 is also made of material such as "Teflon" or the like which forms an efficient seal and long-wearing bearing surface. Additional seals in the form of O-rings made of neoprene or the like 22b and 25a are provided to prevent dirt and foreign matter from entering the bearing. O-ring 22b is positioned in a circular groove formed in the flange member 22 of the nozzle support, and O-ring 25a is positioned in a circular groove formed in the ring gear 25. Thus O-ring 22b forms a seal between the member 22 and the flange 26a, while O-ring 25a forms a seal between the ring gear 25 and the neck 10a. While "Teflon" bearings are definitely better, ball bearings of suitable alloys such as monel or stainless steel may be substituted for the "Teflon" rings 17 and 23.

However, ball bearings will not function as seals, and if they are used, then the O-rings must be used for sealing purposes. Also, ball bearings wear grooves in the surfaces of flanges 12a and 26a and bevel gears.

The drive shaft 28 is supported in the housing by a bearing 31 which is made of "Teflon" or the like, and the ball bearing 34 which is positioned in a recess in the cover plate 13a attached to the gear box which encloses the reduction gearing train 14. The turbine 29, which is positioned in the bushing 12, is threaded to 28 by threads which correspond to the direction of rotation so that the turbine will not become loose during rotation. The turbine 29 is positioned behind the vanes 30 which guide the cleaning solution to the turbine blades.

The bearing 31 is provided with a tapered annular extension 31a, the forward end of which is tapered so that it is thin and flexible and is pressed against the shaft 28 by the fluid pressure in the cavity 11 and thus forms a more effective seal whereby the cleaning solution from this cavity 11 does not pass along the shaft 28 through the bearing 31. In addition, an O-ring 32 is provided in the bearing 31 to reduce the tendency of liquid passing along the shaft 28 through the bearing and into the gear box enclosing the gear train 14 in which the pressure is relatively low. The hole 10b provided in the casting and connected to the outside is to ensure that any leakage past the O-ring 32 does not enter the gear box. The oil seal 33 on the gear box side is provided to prevent any oil leakage to the outside of the gear box.

The shaft 28 is provided with a worm 36 which meshes with the gear 37 that is pinned to the shaft 37a which is journaled in the walls of the gear box. The worm 38 is keyed to the shaft 37a, and this worm meshes with gear 39, which is positioned behind the worm 38 on shaft 37a and is shown in broken outline in FIG. 8. The gear 39 is pinned by the shear pin 41 to the shaft 40, which is also journaled in the walls of the gear box, and which extends out of the gear box. The pinion gear 42 is an integral part of the shaft 40, and O-ring 43 is provided around the shaft 40 and is positioned between the ball-bearing 48 and the spacer washer 47. Another spacer washer 44 is positioned around the O-ring 43 and spacer 47, and the latter washer 44 is provided with a circular groove in which the O-ring 45 is positioned. The O-rings 43 and 45 function to prevent oil from leaking out of the gear box 13 and water from entering said gear box from the outside. An alternative structure taking the place of these O-rings is an oil seal such as the oil seal 33, positioned around the shaft 28. The oil seal may be held in place by a suitable washer 46 to take the axial thrust of the shaft 40. Washers 46 are attached to the wall structure of the gear box by means of suitable screws, and they are provided for holding the washers 44 and 47 in place. Plate 49 is attached to the outside of the gear box by means of screws 50, and this plate functions to hold the end bearing of shaft 37a in a suitable recess provided therefor in said wall structure.

The pinion gear 42 meshes with ring gear 25 that is attached to the bevel gear 24 and to flange 22 of the nozzle-supporting member 19.

The operation of this apparatus is as follows:

The water or cleaning fluid, after passing through the strainer, is given a tangential component of velocity or acquires an angular momentum by the guide vanes 30 positioned ahead of the turbine 29. The blades of the turbine 29 are inclined such that most of the angular momentum is absorbed by the turbine. The water then flows through the main cavity 11, and its flow is straightened by means of the flow straighteners or webs 27 placed in the bushing 26. A further flow straightener exists in the nozzle housing 19, and additional flow straightening ribs are positioned just ahead of the tapered nozzles; thus, the jets leave the nozzles 20 and 21 in a substantially straight direction, and the degree of divergence is minimized.

The turbine drives the shaft 28 at a relatively high speed, and this is reduced by means of two sets of worms and gears which are positioned in the gear box 13. The output of the gear box drives the pinion gear 42, which meshes with the spur gear 25. This drives the bevel gear 24, which meshes with the stationary bevel gear 18 and thus provides for rotation of this device about its vertical axis, while the nozzles are rotated about a horizontal axis. Bevel gear 24 is provided either with a lesser or a greater number of teeth than bevel gear 18 so that the water jets from the nozzles 20 and 21 are directed to different surfaces of the tank for each revolution thereof. It is preferred that the number of teeth in these bevel gears differ by one.

The "Teflon" bearing 31 of the shaft 28 has the end 31a toward the turbine made flexible to tighten on the shaft by hydraulic pressure, thus preventing dirt and leakage to the bearing into the gear box, and O-ring 32 is also imbedded in the "Teflon" bearing for the same purpose, also a hole 10b is provided in the casting connected to the outside and located after the O-ring 32 to insure that no fluid enters the gear box from the main cavity 11. The oil seal 33 on the gear box side is provided to prevent any oil leakage to the outside of the gear box. In FIG. 9 there is shown a nozzle arrangement in which the nozzles are positioned on a common axis or diameter. In such an arrangement the baffle 51 positioned inside of the nozzle supporting member 52 is positioned perpendicular to the axes of the nozzles.

While I have shown a preferred embodiment of the invention, it will be understood that the invention is capable of variation and modification from the form shown so that its scope should be limited only by the scope of the claims appended hereto.

What I claim is:

1. Apparatus for washing the interior of a ship tank and the like, said apparatus being adapted to be suspended in the tank by a fluid supply conduit comprising the combination of a housing having a curved main cavity, said main cavity having an inlet and an outlet, stationary coupling means having one end connected to a fluid supply conduit, means including a first thrust bearing means engaging a rotatable bushing supporting said housing on said coupling member so that said coupling member is connected to said inlet of said rotatable housing, said coupling means having a bevel gear attached thereto, said bevel gear engaging said first thrust bearing means, cleaning fluid nozzle means, means including a second thrust bearing means engaging a second bushing rotatably supporting said nozzle means on said outlet of said housing, a second bevel gear attached to said nozzle means and meshing with said first mentioned bevel gear, said thrust bearing means comprising ring-shaped means of wear-resistant plastic material, and means including said bevel gears and a turbine positioned directly adjacent said first mentioned bushing, said turbine responsive to fluid flowing through said housing rotating said nozzle means with respect to said housing and said housing with respect to said coupling means, said bevel gears having different predetermined numbers of teeth so that the jets of cleaning fluid directed from said nozzles against the interior surfaces of said tank progressively impinge on different areas of said tank surfaces as said nozzle means is rotated with respect to said housing and said housing is rotated with respect to said coupling means so that the entire surface of said tank is covered with cleaning fluid during a cycle of operation.

2. Apparatus as set forth in claim 1 further characterized in that said wear-resistant plastic material from which said bearing means is made comprises of a polymer of tetrafluoroethylene.

3. Apparatus as set forth in claim 1 further characterized in that said ring-shaped means of said first mentioned thrust bearing means forms a seal between said coupling member and said inlet.

4. Apparatus for washing the interior of ship tanks and the like adapted to be suspended by a fluid supply pipe comprising the combination of a housing having a gear box and a main cavity, said main cavity having an inlet and an outlet, a rotatable bushing connected to said inlet, said bushing having a flange at the upper end thereof, a coupling member having one end connected to a fluid supply pipe for supplying fluid to said main cavity, means attaching the other end of said coupling member to said bushing so that said bushing and said housing are rotatable with respect to said coupling member, thrust bearing means positioned between said bushing flange and said attaching means, a turbine, a shaft extending between said main cavity and said gear box supporting said turbine directly adjacent said bushing, a bearing of wear-resistant plastic for said shaft positioned in the wall of said housing between said main cavity and said gear box, cleaning fluid nozzle means, means for supporting said nozzle means on said outlet so that said nozzle means is rotatable with respect to said housing, said supporting means including thrust bearing means, a speed reduction gear train positioned in said gear box and having its input end connected to said shaft, means connecting the output end of said gear train to said nozzle supporting means for rotating said nozzle means with respect to said housing and means connected to said last-mentioned means simultaneously rotating said housing with respect to said coupling member.

5. Apparatus as set forth in claim 4 further characterized in that said housing rotating means includes two meshing bevel gears one of which is fixedly attached to said coupling member and the other of which is attached to said nozzle supporting means.

6. Apparatus as set forth in claim 5 further characterized in that said first-mentioned thrust-bearing means comprises a ring of wear-resistant plastic that is confined between said bushing flange and said one of said bevel gears so that said ring also functions as a seal therebetween.

7. Apparatus as set forth in claim 6 further comprising an O-ring seal between said coupling member and said bushing flange and an O-ring seal between said one of said bevel gears and said bushing to prevent foreign matter from entering said first-mentioned thrust bearing.

8. Apparatus as set forth in claim 5 further characterized in that said housing is provided with guard members on the outer side thereof, partially enclosing said bevel gears to protect said bevel gears from accidental damage.

9. Apparatus as set forth in claim 5 further characterized in that said nozzle-supporting means includes a flange attached thereto and means for attaching said last mentioned flange to the other of said bevel gears.

10. Apparatus as set forth in claim 9 further characterized in that the outlet of said housing is provided with a bushing and said last-mentioned thrust bearing is positioned between this bushing and the other of said bevel gears.

11. Apparatus as set forth in claim 4 further characterized in that said housing is a one piece casting in which said main cavity comprises a fluid passageway of smooth transitions with no sharp bends, said main cavity being lined with corrosion resistant material.

12. Apparatus as set forth in claim 4 further characterized in that said nozzle supporting is provided with a passageway connected with the outlet of said main cavity and liquid flow straightening baffle means is provided in said passageway.

13. Apparatus as set forth in claim 12 further characterized in that additional liquid flow straightening means is provided in the main cavity upstream of said outlet.

14. Apparatus as set forth in claim 4 further characterized in that said housing is a one piece casting and the gear box thereof is sealed to provide for oil lubrication of said speed reduction gear train.

15. Apparatus as set forth in claim 4 further characterized in that said speed reduction gear train is provided with an output shaft driven by a gear of said train mounted thereon and connected thereto by a shear pin which is adapted to shear off in case the apparatus is dropped and an excessive force is applied to said nozzle means tending to rotate said nozzle means.

16. Apparatus as set forth in claim 14 further characterized in that the shaft bearing positioned in said housing wall is made of a polymer of tetrafluoroethylene, said shaft bearing have an internal groove against said shaft, said housing wall having an opening therein leading from said shaft to the outside of said housing to provide an exit for any fluid leaking along said shaft past said O-ring from said main cavity, and an oil seal positioned around said shaft to prevent oil leaking from said gear box to said last mentioned opening.

References Cited by the Examiner
UNITED STATES PATENTS

| | | | |
|---|---|---|---|
| 2,120,784 | 6/1938 | Howald | 239—227 |
| 2,714,080 | 7/1955 | Kennedy et al. | 239—227 X |
| 2,835,540 | 5/1958 | Jorgensen. | |

M. HENSON WOOD, Jr, *Primary Examiner.*

V. WILKS, *Assistant Examiner.*